United States Patent
Ku

(10) Patent No.: US 8,189,161 B2
(45) Date of Patent: May 29, 2012

(54) CHIP-ON-GLASS PANEL DEVICE

(75) Inventor: Tzong-Yau Ku, Tainan (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 857 days.

(21) Appl. No.: 12/208,049

(22) Filed: Sep. 10, 2008

(65) Prior Publication Data

US 2010/0060840 A1 Mar. 11, 2010

(51) Int. Cl.
*G02F 1/1345* (2006.01)
(52) U.S. Cl. ........................................ 349/149
(58) Field of Classification Search .............. None
See application file for complete search history.

(56) References Cited

U.S. PATENT DOCUMENTS 6,922,226 B2 * 7/2005 Park et al. .................. 349/149
2004/0135956 A1 * 7/2004 Kim et al. ................... 349/148
* cited by examiner

*Primary Examiner* — Mark Robinson
*Assistant Examiner* — Mary El Shammaa
(74) *Attorney, Agent, or Firm* — Baker & McKenzie LLP

(57) ABSTRACT

A chip-on-glass panel device includes a glass substrate having a pixel area, an integrated circuit area, and a fan out area, the fan out area located between the pixel area and the IC area, a plurality of integrated circuit devices arranged within the integrated area of the glass substrate, each of the plurality of integrated circuit devices have
an active surface, a plurality of output pads, each arranged on the active surface, and a plurality of signal pads/gamma pads, each arranged on the active surface, and a plurality of signal wires/gamma wires, each having a curved shape geometry and disposed within the fan out area, for connecting the plurality of signal pads/gamma pads of adjacent ones of the plurality of integrated circuit devices through the fan out area.

11 Claims, 5 Drawing Sheets

CHIP-ON-GLASS PANEL DEVICE

BACKGROUND

1. Technical Field

The embodiments described herein generally relate to a layout structure, and more particularly to a circuit layout structure of a display.

2. Related Art

Generally, a liquid crystal display (LCD) device controls light transmittance through a liquid crystal material having a dielectric anisotropy by adjusting an electric field (to display images). The LCD device includes a LCD panel for displaying the images, and a driving circuit for driving pixel cells of the LCD panel. The driving circuit includes a gate driver for driving gate lines of the LCD panel, a source driver for driving the data lines, a timing controller for controlling drive timing of the gate driver and the source driver, and a power supply for supplying power signals required for driving the LCD panel and the driving circuit.

The source driver and the gate driver are separated into a plurality of integrated circuits (ICs) that are manufactured as semiconductor chips. Commonly, the drive IC is directly mounted onto the LCD panel using chip-on-glass (COG) technology, wherein the drive IC is directly installed onto the substrate of the LCD panel. Thus, electrical interconnection between the drive IC and the LCD panel is stable, and a relatively small pitch is acceptable for the installation of the drive IC.

In addition, a combination of COG and Wire-On-Array (WOA) technologies is used where the wiring is disposed on the glass. According to the COG and WOA technique, the IC can be directly attached to the glass substrate, and the wiring can be directly formed on the glass substrate. Accordingly, production costs can be reduced and overall size of the LCD panel can be reduced.

FIG. 1 is a plan view of a conventional LCD module. In FIG. 1, an LCD module 10 includes a glass substrate 100, and several drive ICs 101, 103, 105, 107, 109, 111, 113, and 115, preferred for source drivers. The glass substrate 100 can be made of materials used to make Thin Film Transistors (TFTs), wherein a plurality of TFTs (not shown) is arranged on a surface of the glass. The drive ICs 101, 103, 105, 107, 109, 111, 113, and 115 are disposed on the glass substrate 100 using the COG technique, wherein a die attach adhesive is disposed between the glass substrate 100 and the drive ICs 101, 103, 105, 107, 109, 111, 113, and 115. In addition, flexible printed circuit boards (FPCBs) 117 and 119 are separately disposed near the drive ICs 101, 103, 105, 107, 109, 111, 113, and 115 along a marginal area of the glass substrate 100 to transmit data signals to control the mounted drive ICs 101, 103, 105, 107, 109, 111, 113, and 115. Moreover, the LCD module 10 further includes at least a power/ground source to supply power to the drive ICs 101, 103, 105, 107, 109, 111, 113, and 115.

FIG. 2 is a partially enlarged view of the conventional LCD module of FIG. 1. In FIG. 2, the enlarged rectangle portion defined by dashed lines 15 (of FIG. 1) between drive ICs 113 and 115 includes crowded power/ground and signal lines 211, 213, 215, 217, 219, and 221 arranged on the glass substrate 100 (in FIG. 1). However, the relatively fine size of the power/ground and signal lines 211, 213, 215, 217, 219, and 221 of the drive IC is problematic.

FIG. 3 is a side view of a conventional driver circuit layout structure. In FIG. 3, drive ICs 301 and 303 (preferably source drivers) provide data signals to pixels of the LCD panel via data lines 311, 313, 315, 317, 319, 321, and 323, and 341, 343, 345, 347, 349, 351, and 353, respectively. The drive IC 301 connects to the adjacent IC 303 via lateral lines 371, 373, and 375 and/or under lines 381 and 383 for transmitting data/gamma signals. In addition, a power line 361 competes with the lateral lines 371, 373, and 375 for the limited space. In a similar way, under power lines, i.e., VGH, VGL, or Vcom lines 391, also compete with under lines 381 and 383 for the confined space.

Inevitably, the power lines 361 and 391 must be made small to allow them to fit in the space between or under the adjacent source drive IC 301 and 303, or must be decreased in number to accommodate to the overall structure. Either way, the power lines 361 and 391 are problematic because they usually cause overheating, circuit damage, explosion, and even fire. Therefore, a novel circuit layout structure of a COG display panel is needed to improve the wire configuration.

SUMMARY

An integrated circuit layout structure of a COG display and pad positions of a driver integrated circuit is described herein.

In one aspect, a chip-on-glass panel device includes a glass substrate having a pixel area, an integrated circuit area, and a fan out area, the fan out area located between the pixel area and the IC area, a plurality of integrated circuit devices arranged within the integrated area of the glass substrate, each of the plurality of integrated circuit devices have an active surface, a plurality of output pads, each arranged on the active surface, and a plurality of signal pads/gamma pads, each arranged on the active surface, and a plurality of signal wires/gamma wires, each having a curved shape geometry and disposed within the fan out area, for connecting the plurality of signal pads/gamma pads of adjacent ones of the plurality of integrated circuit devices through the fan out area.

In another aspect, a chip-on-glass panel device includes a glass substrate having a pixel area, an integrated circuit area, and a fan out area, the fan out area located between the pixel area and the integrated circuit area, a plurality of integrated circuit devices arranged within the integrated circuit area of the glass substrate, each of the plurality of integrated circuit devices have an active surface, a plurality of output pads arranged on the active surface, a die attach adhesive bonding the integrated circuit devices on the glass, and a plurality of signal pads/gamma pads arranged on the active surface, and a plurality of signal wires/gamma wires, each having a curved shape geometry and disposed within the fan out area, for connecting the plurality of signal pads/gamma pads of adjacent ones of the plurality of integrated circuit devices.

These and other features, aspects, and embodiments are described below in the section "Detailed Description."

BRIEF DESCRIPTION OF THE DRAWINGS

Features, aspects, and embodiments are described in conjunction with the attached drawings, in which.

DETAILED DESCRIPTION

Figure 4:
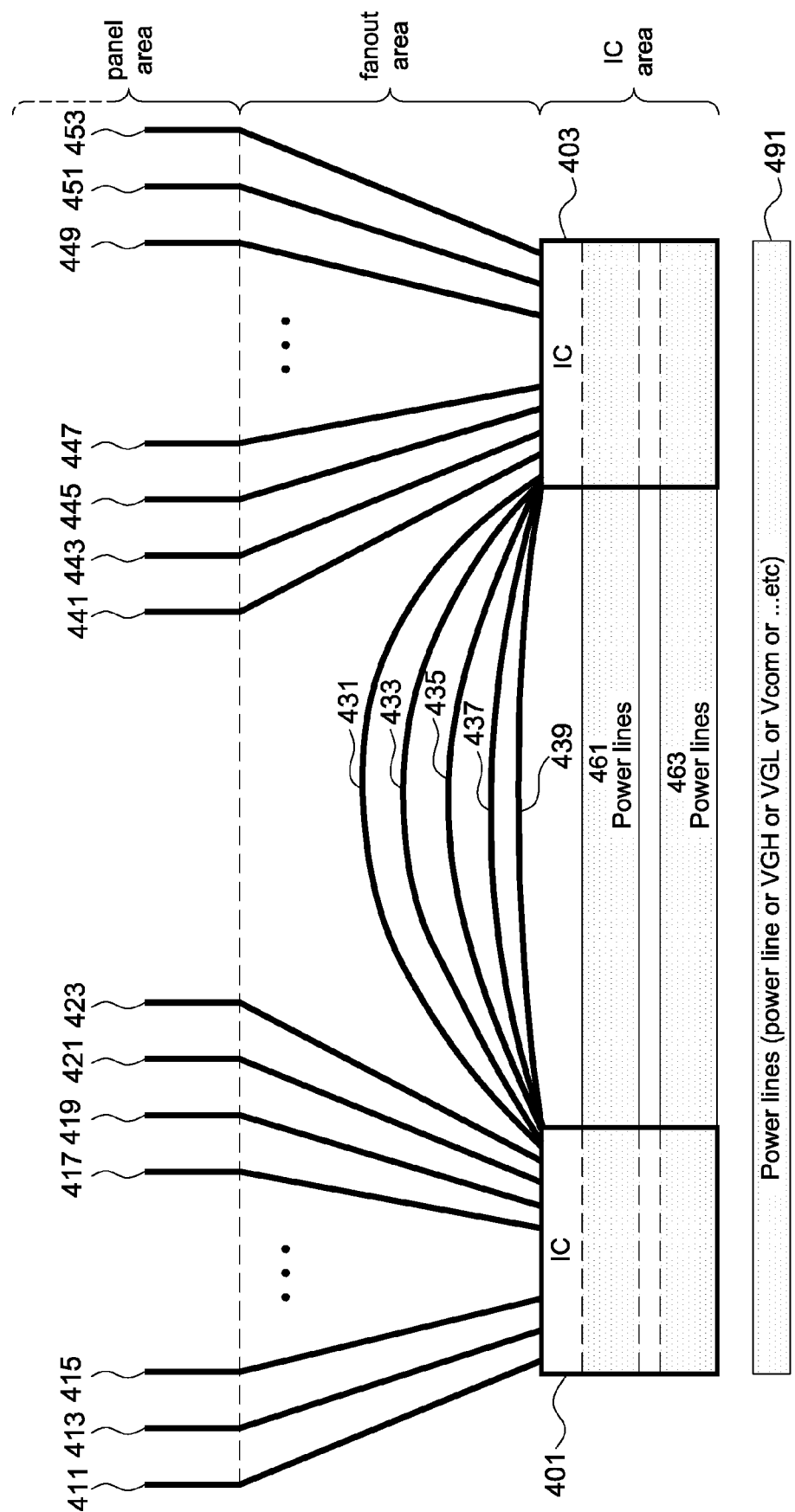
FIG. 4 is a side view of an exemplary driver circuit layout structure according to one embodiment.

FIG. 4 is a side view of an exemplary driver circuit layout structure according to one embodiment. In FIG. 4, an exemplary layout structure of a COG panel and pad positions of a drive IC can be configured on a glass substrate (not shown) to form a display, and can include ICs 401 and 403, i.e., source drive ICs. The glass substrate (not shown) can include a display panel area having a plurality of pixels, an IC area for the ICs 401 and 403, and a fan out area between the IC area and the panel display area. The signals wires and gamma wires 431, 433, 435, 437, and 439 can be arranged to have a curved shape geometry disposed in the fan out area.

Figure 1:
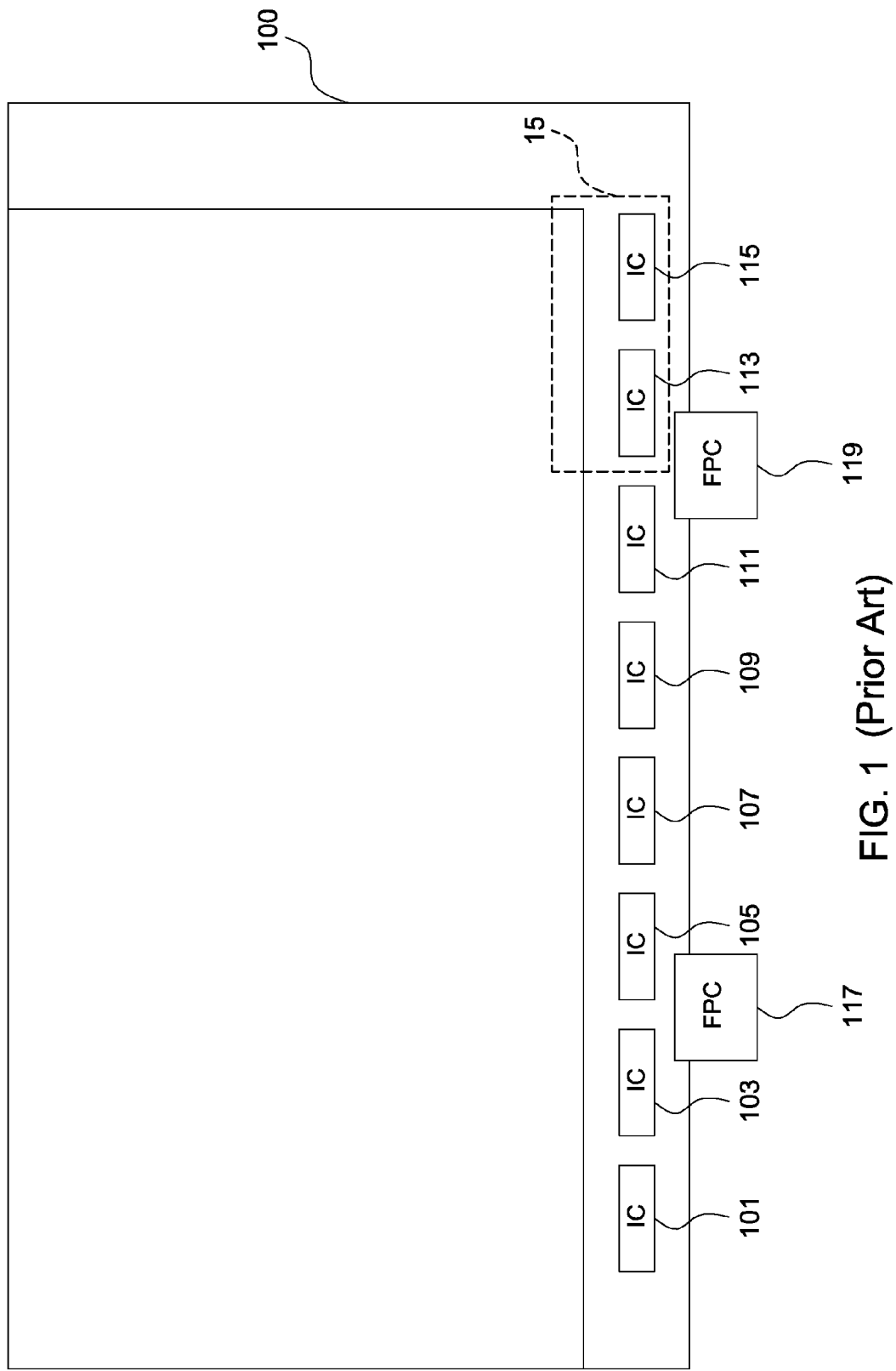
FIG. 1 is a plan view of a conventional LCD module.
Figure 2:
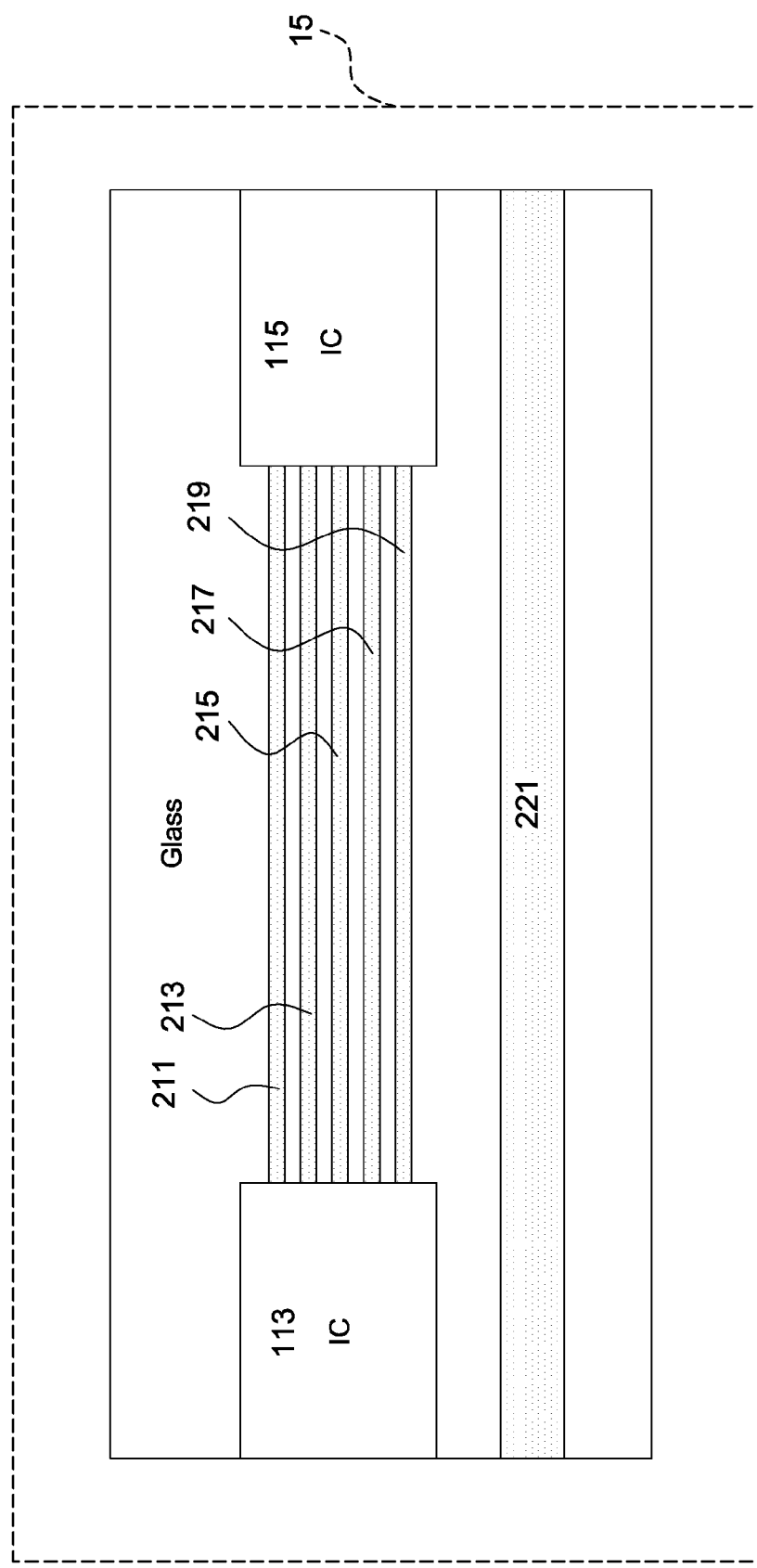
FIG. 2 is a partially enlarged view of the conventional LCD module of FIG. 1.
Figure 3:
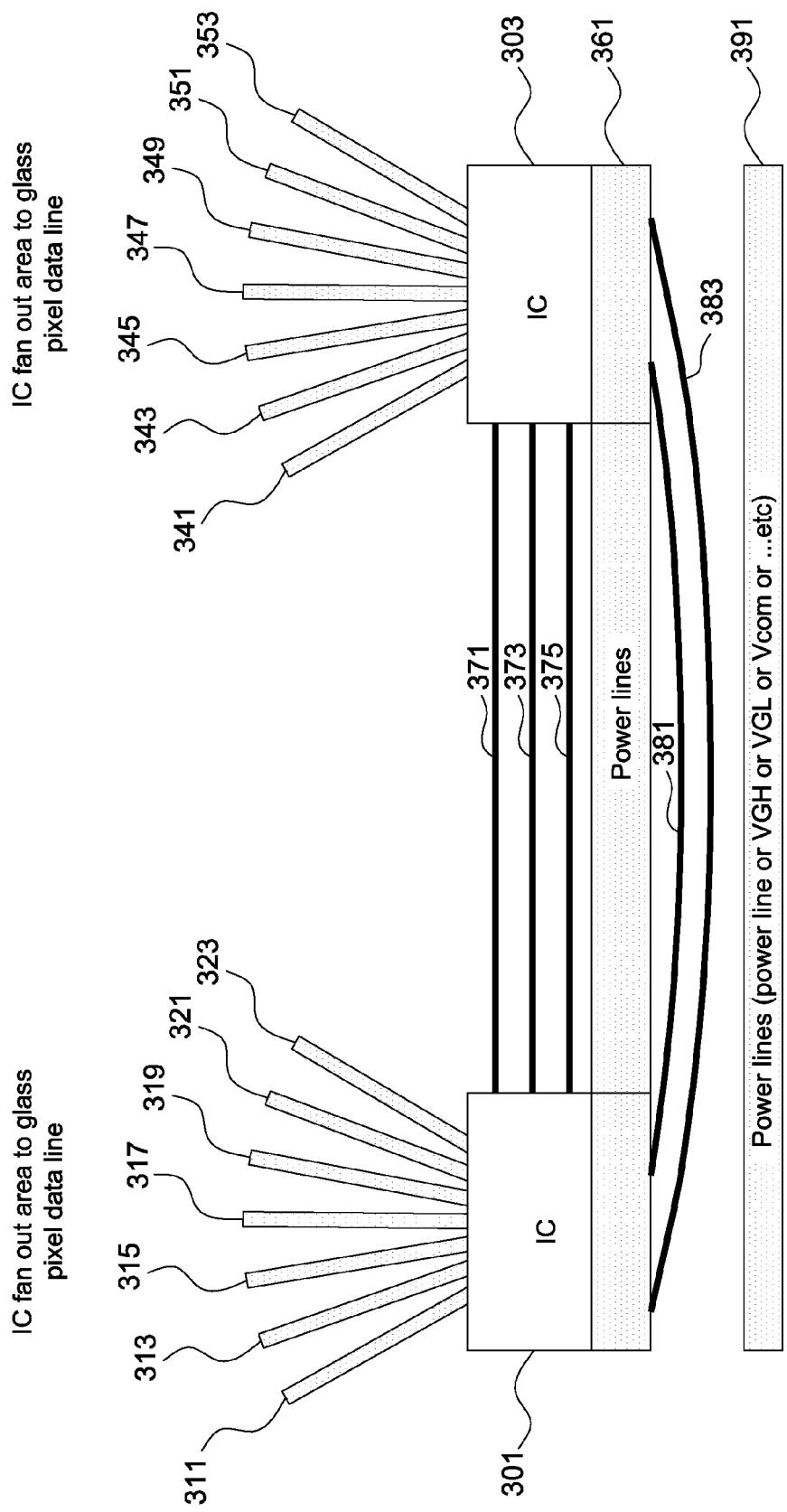
FIG. 3 is a side view of a conventional driver circuit layout structure.
Figure 5:
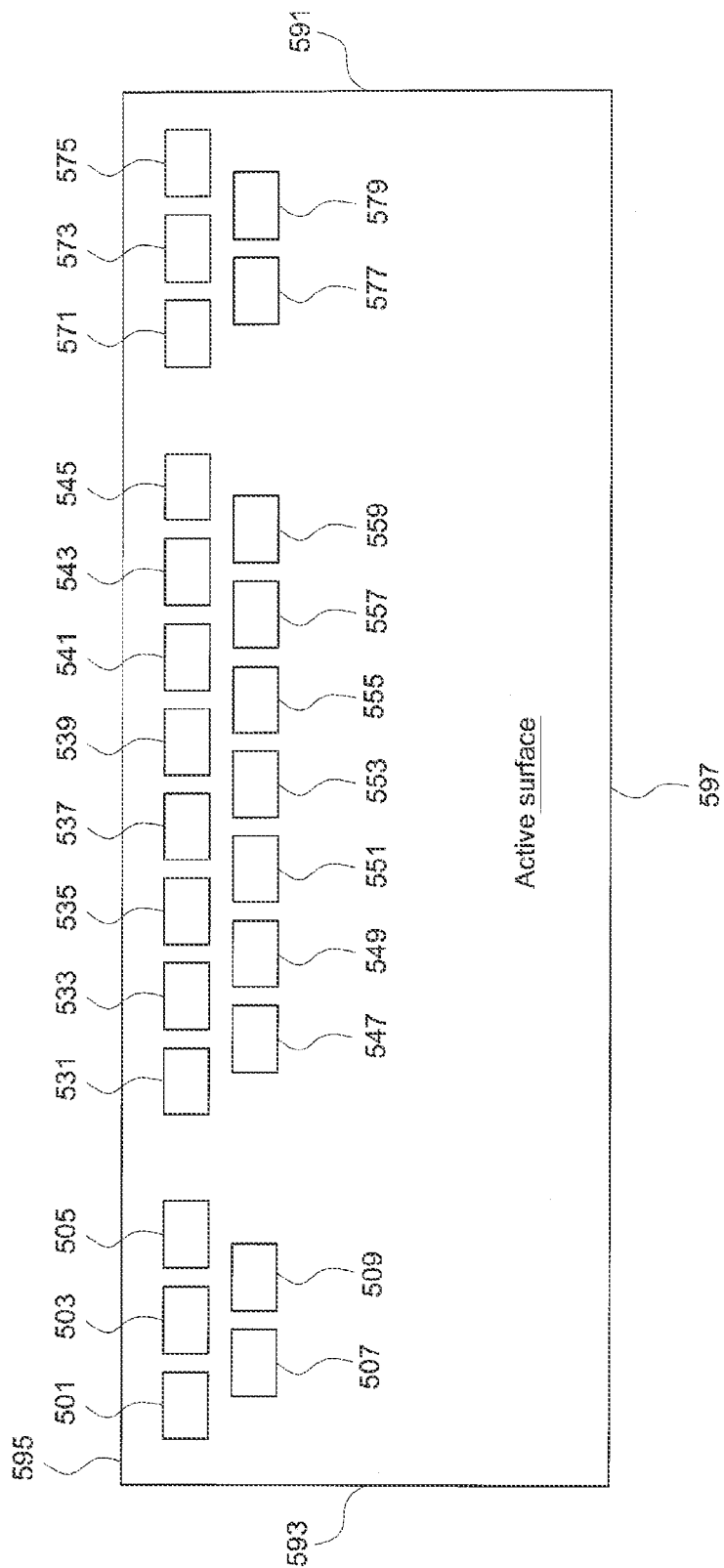
FIG. 5 is a plan view of exemplary output pads and signals/gamma pads according to one embodiment.

FIG. 5 is a plan view of exemplary output pads and signals/gamma pads according to one embodiment. In FIG. 5, an active surface of the IC 401 or 403 (in FIG. 4) can be arranged to include a plurality of output pads 531 to 559, signal pads/gamma pads 501 to 509 and 571 to 579 on the active surface. The active surface can have a generally rectangular shape defined between a plurality of side edges 591, 593, 595 and 597 of the integrated circuit device. With reference to FIGS. 4 and 5, the side edges 591 and 593 may correspond to opposite short side edges of the integrated circuit device that may be facing another short side edge of an adjacent integrated circuit device. The side edges 595 and 597 may correspond to opposite long side edges that are connected between the short side edges 591 and 593. The signal pads/gamma pads 501 to 509 and 571 to 579 can be distributed parallel to the side edge 595 in two corner regions respectively proximate to the side edges 593 and 591. The output pads 531 to 559 can be distributed parallel to the side edge 595 in a central region between the two corner regions, and can be connected to the data lines 411 to 423 or 441 to 453 corresponding to the pixels within the panel display area through the fan out area (in FIG. 4). In addition, the signal wires/gamma wires 431, 433, 435, 437, and 439 can connect the signal pads/gamma pads of the IC 401 (in FIG. 4) to the signal pads/gamma pads of the IC 403 for sequentially transmitting data signals or gamma signals to adjacent ICs. The signal wires/gamma wires 431, 433, 435, 437, and 439 can be curved, and can be disposed within the fan out area, instead of being in the space delimited between the two mutually facing side edges of two adjacent ICs as shown in FIG. 3. Accordingly, the original space occupied by the signal wires/gamma wires 431, 433, 435, 437, and 439 between two adjacent integrated circuit devices can be released for use as power lines 461 and 463, as well as under power lines 491, including the VGH/VGL/Vcom lines. Accordingly, as shown in FIG. 4, the region delimited between the two mutually facing side edges of the integrated circuit devices 401 and 403 can be substantially occupied by the power lines 461 and 463.

While certain embodiments have been described above, it will be understood that the embodiments described are by way of example only. Accordingly, the device and method described herein should not be limited based on the described embodiments. Rather, the devices and method described herein should only be limited in light of the claims that follow when taken in conjunction with the above description and accompanying drawings.

What is claimed is:

1. A chip-on-glass panel device, comprising:
a glass substrate having a pixel area, an integrated circuit area at a periphery of the pixel area, and a fan out area located between the pixel area and the integrated circuit area;
first and second integrated circuit devices attached with the glass substrate and arranged adjacent to each other in the integrated circuit area, the first integrated circuit device having a first side edge, the second integrated circuit device having a second side edge facing and spaced apart from the first side edge, and each of the first and second integrated circuit devices comprises:
an active surface;
a plurality of output pads, each arranged on the active surface; and
a plurality of signal pads/gamma pads, each arranged on the active surface; and
a plurality of signal wires/gamma wires, each of the signal wires/gamma wires having a curved shape extending in the fan out area and lying substantially outside a region delimited between the first and second side edges, each of the signal wires/gamma wires having a first end connected with one of connecting the plurality of signal pads/gamma pads of the first integrated circuit device, and a second end connected with one of the plurality of signal pads/gamma pads of the second integrated circuit device.

2. The chip-on-glass panel device of claim 1, wherein the plurality of output pads are connected to a plurality of data lines that extend across the fan out area into the pixel area.

3. The chip-on-glass panel device of claim 1, further comprising at least one power/ground line extending in the region delimited between the first and second side edges to supply power/ground voltages to each of the first and second integrated circuit devices.

4. The chip-on-glass panel device of claim 3, wherein the power/ground line extends beneath the first and second integrated circuit devices.

5. The chip-on-glass panel device of claim 1, wherein the glass substrate includes a plurality of thin film transistors arranged in the pixel area.

6. The chip-on-glass panel device of claim 1, wherein the glass substrate is provided within a liquid-crystal display device.

7. The chip-on-glass panel device of claim 1, wherein the plurality of signal wires/gamma wires are formed according to a wire-on-array technique.

8. The chip-on-glass panel device of claim 1, wherein the first integrated circuit device further includes a third side edge opposite to the first side edge, and a fourth side edge connected with the first and third side edges, the signal pads/gamma pads of the first integrated circuit device being distributed parallel to the fourth side edge in two spaced-apart corner regions of the active surface respectively proximate to the first and third side edge.

9. The chip-on-glass panel device of claim 8, wherein the output pads of the first integrated circuit device are arranged parallel to the fourth side edge in a central region of the active surface between the two corner regions.

10. The chip-on-glass panel device of claim 1, wherein the region delimited between the first and second side edges is substantially occupied by power/ground lines that connect with the first and second integrated circuit devices.

11. The chip-on-glass panel device of claim 1, wherein the signal wires/gamma wires lie outside the pixel area.

* * * * *

UNITED STATES PATENT AND TRADEMARK OFFICE
CERTIFICATE OF CORRECTION

PATENT NO. : 8,189,161 B2  Page 1 of 1
APPLICATION NO. : 12/208049
DATED : May 29, 2012
INVENTOR(S) : Tzong-Yau Ku It is certified that error appears in the above-identified patent and that said Letters Patent is hereby corrected as shown below:

Column 4, line 18; delete "connecting"

Signed and Sealed this
Seventh Day of August, 2012

David J. Kappos
*Director of the United States Patent and Trademark Office*